US006182132B1

(12) United States Patent
Bilakanti et al.

(10) Patent No.: US 6,182,132 B1
(45) Date of Patent: Jan. 30, 2001

(54) PROCESS FOR DETERMINING IN SERVICE STATUS

(76) Inventors: Mallikarjuna Gupta Bilakanti, 1053 Arcaro Ct., Gahanna, OH (US) 43230; Alan Paul Curtis, 40 Hampden Dr., Granville, OH (US) 43023; Carmen Edward DeArdo, 9755 Hounsdale Dr. NW., Pickerington, OH (US) 43147

( * ) Notice: Under 35 U.S.C. 154(b), the term of this patent shall be extended for 0 days.

(21) Appl. No.: 08/819,459

(22) Filed: Mar. 17, 1997

(51) Int. Cl.[7] .......................... G06F 15/173; H04L 12/28
(52) U.S. Cl. ............................................ 709/223; 370/254
(58) Field of Search ........................ 395/200.52, 200.53, 395/200.54, 200.55, 200.64, 200.65, 200.72, 185.1, 183.01, 185.01, 185.02; 370/449, 401, 351, 230, 254, 256; 364/242.95, 284.4; 709/222, 223, 224, 225, 234, 235, 242

(56) References Cited

U.S. PATENT DOCUMENTS

| | | | |
|---|---|---|---|
| 4,545,013 | * 10/1985 | Lyon et al. .......................... 364/200 |
| 5,226,120 | * 7/1993 | Brown et al. ........................ 395/200 |
| 5,412,656 | * 5/1995 | Brand et al. .......................... 370/61 |
| 5,542,047 | * 7/1996 | Armstrong ..................... 395/200.11 |
| 5,574,860 | * 11/1996 | Perlman et al. ................. 369/200.06 |
| 5,630,184 | * 5/1997 | Roper et al. ..................... 395/200.01 |
| 5,710,885 | * 1/1998 | Bondi ............................... 395/200.54 |
| 5,719,861 | * 2/1998 | Okanoue .............................. 370/351 |
| 5,721,819 | * 2/1998 | Galles et al. ..................... 395/200.15 |
| 5,761,428 | * 6/1998 | Sidey ............................... 395/200.53 |
| 5,805,578 | * 9/1998 | Stripe et al. ......................... 370/255 |
| 5,862,404 | * 1/1999 | Onaga ................................. 395/828 |
| 5,974,250 | * 10/1999 | Angelo et al. ....................... 395/653 |

OTHER PUBLICATIONS

Ranat, Michel "Distributed Algorithms and Protocols" 1988, pp. 30–33.

* cited by examiner

*Primary Examiner*—Zarni Maung
*Assistant Examiner*—Tod Kupstas

(57) ABSTRACT

A method for determining the In Service/Out of Service status of an Orchestrated Entity (OE) by each processor-based device in the Orchestrated Entity self-determining its In Service/Out of Service status. The method is rule-based and provides, in reaching a determination of In Service status by a device, greater resilience to failure of other devices comprising the OE. Resilience is determined both by the rule applied in determining In Service status and by the importance assigned to the various devices comprising the OE, that importance having an assigned value.

8 Claims, 7 Drawing Sheets

FIG. 5

PROCESSOR 20

| MEMORY 25 | ICTTD 32 | TCTT 34 |
|---|---|---|
| DEVICE IDENTIFIERS | | |
| RESIDENT DEVICE IDENTIFIER | RESPONSE CLOCK 22 | |
| | RESPONSE COUNTER 26 | |
| DEVICE VALUES | REPOLLING CLOCK 24 | |
| THRESHOLD VALUE | | |

PROCESS FOR DETERMINING IN SERVICE STATUS

This invention relates to networked devices which act in concert with one another and give the appearance of a single device, an Orchestrated Entity, when interacting with devices which are not part of the Orchestrated Entity. More particularly, this invention relates to a process for the Orchestrated Entity to determine whether each device comprising part of the Orchestrated Entity can declare itself "In Service".

BACKGROUND

With the growth of distributed operations in telecommunications and computing operations, there are now often collections of equipment and software, i.e., devices, which operate in concert with one another in providing some service to the larger telecommunications computing, or electrical or electro-mechanical system in which they reside.

This can be as simple as a CPU which accesses a database stored on a separate server in responding to a plurality of workstations or can consist of a more elaborate collection of equipment.

For example, in a computer environment, a group of computers may each act as a tasking station to provide information to a larger group of workstations. Each tasking station computer does not contain necessary databases populated with data to perform all the requested tasks to respond to the served workstations. Instead, when information from a database is required, the tasking station computer accesses a server which has the populated databases resident. The separation of server from tasking station allows efficient use of system resources. For example, the server can have greater memory and speed than the querying tasking stations. Moreover, more than a single server can be used to increase response time and to segregate specific types of data. Further, to assure the efficient utilization of all servers, several controllers can be used to monitor data requests from the tasking stations and direct and distribute the tasking stations' requests between all servers. In this example, communication between the servers and the tasking stations must be through the controllers. This interactive subset of system components, from the perspective of the remainder of the system, could just as well be a single piece of equipment. It is unimportant which workstation connects to which tasking station since each tasking station has the potential to provide the same results in response to a request from the workstation. This seamless collaboration of devices providing a service to the other resources in the system is referred to hereafter as an orchestrated entity (OE).

As long as the OE is fully functional, that is, each and every device making up the OE is functioning and the communication lines between the devices are operational, then the OE can properly serve the other system resources. However, should any device or communication line go down, there is the potential that the OE may not be able to adequately serve the other system resources. As examples, this may be because, in the case of a server, that pertinent database information cannot be accessed; in the case of a controller, that not all servers are accessible; and in the case of tasking stations, that requests from other system resources accessing the OE through that particular tasking station will not be recognized by the OE. On the other hand, OE's can be constructed to have a certain resilience against loss of one or more devices within the OE, being capable of operating without all devices operating.

The problem, then, is to determine whether the OE is sufficiently operational at any point in time to adequately provide the desired service to the other network resources. In conventional systems, this has been the task of a master device or master node which monitors the condition of each other device and communication channel. If a device or communication channel does not respond to the master node's direct polling, that device is declared "Out of Service". Based on the master node's polling results, the master device then determines whether the OE, as a whole, is sufficiently operational to adequately provide the desired service to the other network resources and, if not, declares the OE "Out of Service" to the other network resources which must then either seek the service from alternative system resources or await the OE returning to "In Service" status.

The conventional approach to determining resource status for an OE suffers from several problems. First, the master node must be selected and connected to each device and line in the OE. Second, if the master node fails, the OE must be declared out of service because the status of other devices and lines in the OE cannot be otherwise determined.

There is therefor a need for an approach for determining whether devices in the OE are In Service and whether the OE is In Service without the use of a master polling device.

Solution

Each and Every Device Comprising Part of the OE determines OE Status for Itself.

This problem is solved and a major advance over the prior art is achieved by the instant invention which provides a distributed method for each device in an OE to self-diagnose whether the OE should be considered by that device In Service based that device, comprising part of OE, independently determining that sufficient other devices comprising the OE are operational that the device making the determination can declare itself In Service.

Conventional processor-based electronic equipment and software, i.e., devices, are capable of polling, that is, sending a signal through a communication line to another device, receiving a signal in response, and recognizing that responding signal. In one type of polling called "Echo" polling, the initiating device sends a signal which is simply returned by the polled devices. In a second type of polling, the initiating device sends a more complex signal, one which includes as part of the signal an identifier which identifies the initiating device, and the responding device likewise responds with a more complex signal, one which includes as part of the signal an identifier which identifies the responding device as part of the returned signal.

Both types of polling are used in providing device status to monitoring equipment.

The instant invention recognizes and implements a series of rules discovered by the inventors which, through device polling, permit the devices comprising the OE to self-diagnose OE status.

To simplify this discussion, a device which relays signals from an initiating device to a responding device is hereafter called a "hub". An initiating device and a responding device are both called "nodes". The pathway by which signals are sent between the nodes and hubs are called "lines". Devices are said to "talk" to one another when an initiating signal results in a responding signal, regardless of the type of signal.

A Rule-Based Determination of Device Status

A. Simplistic Determination—"In Service" Permits Only Failure of One Hub

A node declares itself "In Service" if it passes either of the following tests:

Rule 1) if a node is able to talk to all hubs in the OE, then the node is "In Service"; or Rule 2) if the node fails Rule 1, but the node can talk to all other nodes, then the node is "In Service".

Otherwise, the node is "Out-of-Service".

Referring to FIG. 1, an OE is illustrated which has two hubs, Hi and Hii, each connecting four Tasking Stations, TS1–TS4, to two Responding Devices, RDa and RDb. Consider RDa as the node of interest, consider further that hub Hi, which is normally capable of sending a return signal to RDa is not currently able to do so, and consider further still that all other hubs and nodes are capable of sending a return signal.

As a consequence of not being able to talk to Hi, RDa fails to be "In Service" under Rule 1 and must apply Rule 2 to determine its final status. Under Rule 2, in the particular configuration shown in FIG. 1, RDa connects through operational hub Hii to all other nodes, RDb and TS1–4; consequently, RDA will declare itself "In Service".

Similarly considering every other node in FIG. 1 against Rule 1 and Rule 2 will likewise result in a determination that the node is "In Service" because, as the OE is configured, lines extend from each node to each hub. Thus, every node can talk with every other node through hub Hii, even if hub Hi is not operational, thereby satisfying Rule 2.

Next consider that not only Hi but also RDb is not capable of sending a signal. RDa fails to be "In Service" under Rule 1 since it cannot talk with all hubs and further fails to be "In Service" under Rule 2 because it cannot talk with RDb.

Similar investigation of every other node in FIG. 1 against Rule 1 and Rule 2 will likewise result in a determination for each node that the node is likewise out of service, first, because no node can talk with hub Hi—failing to satisfy Rule 1—and second, because no other node can talk with node Rdb—failing to satisfy Rule 2.

Using the above rules, there will be circumstances in which certain nodes declare themselves "In Service" under Rule 1 because they are able to talk to hubs while other nodes in the OE are not operational. The application of Rule 1 permits the operational devices in the OE to be "node resilient" under Rule 1. However, should a hub subsequently fail, that resilience ceases and all nodes in the OE will declare themselves "Out of Service" by failing under Rule 2 after failing under Rule 1 when a node and a hub are "Out of Service". Thus, if the decision whether an OE is In Service is determined by each and every node comprising the OE declaring that it is In Service, then beyond Rule 1 application, any node declaring an Out-of-Service status. Consequently, by such actions, the OE will in such a circumstance also be Out of Service. Thus, in the most stringent and simplistic approach to OE status, testing any single operational node under Rules 1 and 2 likewise determines OE status, no further tests being required.

B. Operational Importance Determination—"In Service" Permits Failures Until Weighted Functionality Degrades Below Acceptable Level However, there may be in some systems, and for some OE's, the need or ability for the OE to have more resilience, that is, to function without all nodes being declared In Service. This is easily accomplished under the present invention by assigning an identifier to each node; listing each node by its identifier in the processor memory in each node and in each hub; assigning a value to each node and to each hub; and correlating the assigned value to the appropriate listed nodes and hubs in the processor memory of each node such that identification of a node likewise identifies the assigned value of the node. Further, the polling signal and responding signal sent by each node is constructed to include the identifier of each node and each hub with which that node can talk. Once this is implemented, then each node can be tested under the following rule:

Rule 3) If the node can talk to all hubs and nodes that any other node says it can talk to, and the sum of the values of all these nodes is more than a predetermined "threshold" value, then the node is In Service.

Consider FIG. 1 again, noting that RDa and RDb have both been assigned a value of 4; that Hi and Hii have both been assigned a value of 0; and TS1, TS2, TS3 and TS4 have each been assigned a value of 2. Assuming that Hii and TS4 are nonfunctioning, each node commences polling by sending a polling signal which includes only its own identifier. Each responding node responds with both its identifier plus the identifier of every other node from which it has received a responding signal plus the identifier of the node which sent the polling signal. In FIG. 1, this means that TS1 receives a responding signal from TS2,TS3,Hi,RDa and RDb. Likewise, every other node in the OE will receive responding signals from the set of nodes (TS1,TS2,TS3,Hi,RDa, RDb) since every operating node can communicate through hub Hii. Consequently, the first part of Rule 3 is satisfied, each polling node can talk to all hubs and nodes that any other node says it can talk to.

For the purpose of this discussion, assume that the last character of the node designation is the node identifier, e.g., the node identifier for TS4 is 4 and that for RDb is B. The polling signal for TS1 initially includes "1" as its identifier. As each node and hub responds, each identifier for each responding node and hub which is not then part of the polling signal for TS1, will be added to and made a part of the polling signal for TS1. This is also the case with every other node.

Moreover, as each node and hub responds to TS1, it includes as part of its responding signal the identifier for every node and hub which has responded to its polling signal. Eventually, the polling signal for TS1 includes the identifiers (1-2-3-I-A-B). This means that TS1 has received a responding signal from TS2,TS3,Hi and RDb, but has not received a responding signal from either TS4 or Hii. In one implementation of the instant invention, the order in which the identifiers appear in a signal determine which is the identifier for the polling node, which is the identifier for the responding node or hub and which are the identifiers for the nodes and hubs with which the node can talk.

Likewise, each of the other functioning nodes will ultimately have an initiating signal that includes the identifiers (1-2-3-I-A-B) and that each node will ultimately provide a responding signal that includes the identifiers (1-2-3-I-A-B) as well.

Applying Rules 1 and 2, the failure of Hii and TS4 would result in all active nodes in the OE declaring themselves "Out of Service". However, in this extension of the invention, using the same polling concepts but assigning weighted values to the various devices comprising the OE enables the nodes comprising the OE to continue to declare themselves In Service unless and until the functionality of the OE degrades below a determined level, thus increasing the operational resilience of the OE. In the instant invention that degradation is expressed in a correlated value of the nodes and hubs operating in the OE exceeding a selected threshold value.

Applying Rule 3 to this example and specifically to TS1, TS1 will ultimately receive a signal having a correlated value of 14 (TS1=2; TS2=2; TS3=2; Hi=0; RDa=4; RDb=4) since neither TS4 nor Hii are functioning.

Avoidance of "Split Personalities" by Threshold

The present invention appreciates that, in order to prevent a single OE from dividing into two OE's that both think they are In Service, the correlated value for the nodes and hubs providing responding signals to a polling node must be more than half the sum of the correlated values of all the nodes and hubs comprising the OE. Thus, in the example of TS1 above, in order to be declared In Service, first, no other node can talk to more nodes than TS1 and, second, the sum of the correlated values for the nodes and hubs providing responding signals to TS1 must be more than 8—half of 16 which is the sum of the correlated values for all nodes and hubs comprising the OE in the instant example. The value 8 is thus the threshold value which must be exceeded in order to avoid nodes comprising two halves of the OE to separately declare themselves "In Service" and operate independently as though they were each the OE.

In this example, since 14 is greater than 8, and since TS1 is able to talk with the same nodes that any other node is able to talk to, TS1 will declare itself "In Service". Investigation of every other functioning node in the OE of FIG. 1 will result in the determination that every other node will likewise have a correlated value of 14 for the sum of the nodes and hubs with which it can talk and will declare itself "In Service". This indicates that any node is capable of determining the service status of the OE. Hence, if under Rule 3 any node declares itself In Service, then the OE as a corollary will be "In Service".

The reader may note that no attempt is made to independently test the lines between nodes. This is unnecessary inasmuch as a failure of a line will result in no signal being communicated across the line. Consequently, a node or hub at either end of the line is unable to talk with its counterpart. Consequently, the loss of a line is the same as the loss of a hub or a node from the perspective of the individual node and from the perspective of the OE's service status.

In accordance with one aspect of our invention, distributed determination of OE status is achieved by each node comprising part of the OE independently determining its service status.

In accordance with another aspect of our invention, the status of a node by corollary determines the status of the OE.

In accordance with yet another aspect of our invention, the status of a node is determined by applying two conditions: first if the node can talk to all hubs in the OE, then it is In Service; and second, if the node fails to be declared In Service under the first condition but can talk to all other nodes in the OE, then it is In Service.

In accordance with still yet another aspect of our invention, an OE can be considered still In Service, although not all nodes or hubs are In Service, by a node determining which nodes and hubs are In Service, weighing the importance of the In Service nodes and hubs to OE In Service status, and determining if the importance of the In Service nodes and hubs is sufficient to consider the OE In Service.

In accordance with a further aspect of our invention, the importance of nodes and hubs is represented by weighted values, each node and each hub in the OE being assigned a weighted value.

In accordance with a still further aspect of our invention, determining whether the aggregate importance of responding nodes and hubs is sufficient to declare a polling node OE In Service is determined by summing the assigned values of the In Service nodes and hubs and determining if that sum exceeds a threshold value.

In accordance with a still yet further aspect of our invention, to avoid an OE splitting into two OE's, the threshold value must be greater than one half the sum of all the values for all nodes and hubs in the OE.

DESCRIPTION OF THE DRAWINGS

FIG. 5 is a schematic illustration of a processor representative of any device in the OE required to provide more than an Echo signal.

DETAILED DESCRIPTION OF THE INVENTION

Figure 1:
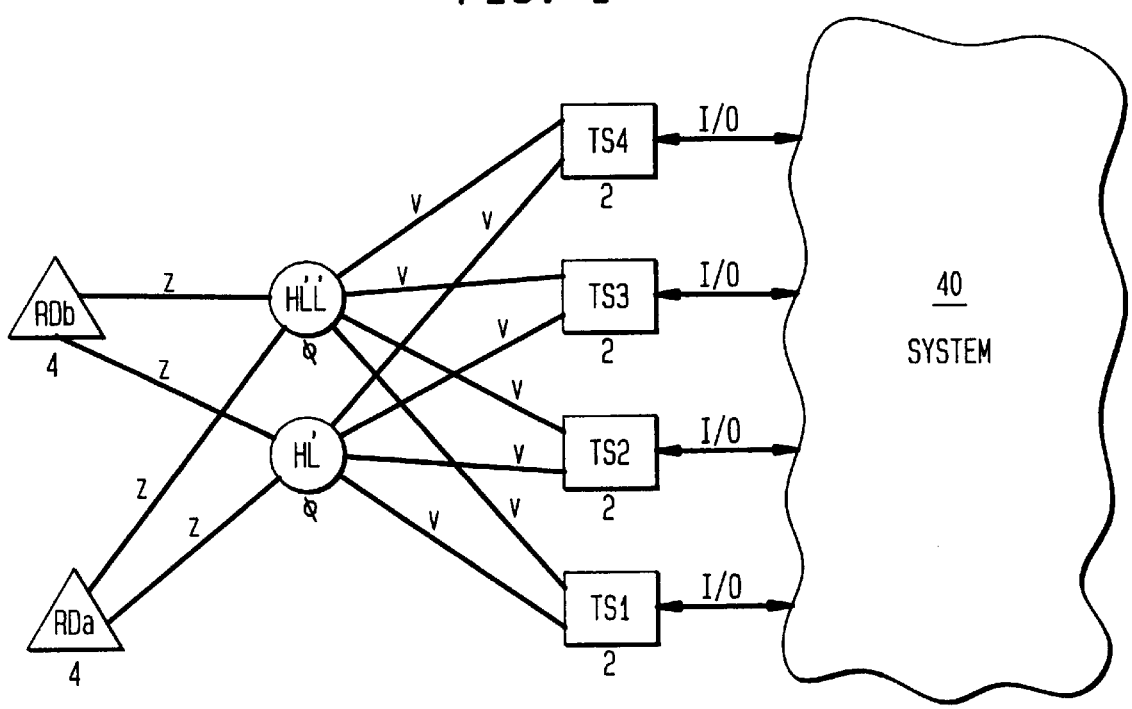
FIG. 1 is a schematic of an OE comprised of 4 Tasking Stations, two Hubs and two Responding Devices.

FIG. 1 is an illustration of an orchestrated entity (OE) 10 with reference to which the instant invention will be described. The reader should recognize that this OE and its configuration is not limiting, the invention has broad application to any group of devices having polling capability which operate as an OE, whether characterized as telecommunications, computer, electrical, electromechanical or otherwise in purpose or construction.

In the illustration, the OE 10 is constructed of three layers of processors—Tasking Stations TS1–TS4, Controllers Hi and Hii, and Servers RDa and RDb.

The OE is part of and serves a system 40 of equipment and software with which it is in communication through the four tasking stations TS1,TS2,TS3 & TS4 along lines I/O.

As shown in FIG. 5, each Tasking Station TS1–TS4 is comprised of a processor 20 having memory 25, a Response Counter 26, a Response Clock 22 and a Re-Polling Clock 24. Stored in memory 25 is the identifier for each device in the OE 10. Of the identifiers stored, the processor can identify the specific identifier assigned to the Tasking Station of which it is a part. While not necessary to the first implementation of the invention, for the second implementation, as shown in FIG. 5, each Tasking Station TS1–TS4 processor 20 is capable of storing in a first location called "I Can Talk To Directly" (ICTTD) 32 in memory the identifiers for each device in the OE from which that Tasking Station receives a responding signal. Likewise as shown in FIG. 5, each Tasking Station TS1–TS4 is capable of storing in a second location called "They Can Talk To" (TCTT) 34 all other identifiers appearing as part of a responding signal.

As shown in FIG. 1, two Controllers, Hi and Hii, respectively, are each connected to all Tasking Stations TS1–TS4 by lines V. Each controller Hi and Hii is comprised of a processor 20 having memory 25. While not necessary to the first implementation of the invention, for the second implementation as shown in FIG. 5, each Controller Hi and Hii processor 20 is further comprised of a Response Counter 26, a Response Clock 22, and a RePolling Clock 24. In the second implementation, the identifier for each device in the OE 10 is stored in permanent memory 25 and, of the identifiers stored, the processor 20 can identify the specific identifier assigned to the Controller of which it is a part.

Two Servers, RDa and RDb, respectively, are each connected to both Controllers Hii and Hii by lines Z. Each Server RDa and RDb is comprised of a processor 20 having permanent memory 25, a Response Counter 26, a Response Clock 22 and a Re-Polling Clock 24. Stored in permanent memory 25 is the identifier for each device in the OE 10. Of the identifiers stored, the processor can identify the specific identifier assigned to the Server of which it is a part. While not necessary to the first implementation of the invention, for the second implementation, as shown in FIG. 5, each Server RDa and RDb processor 20 is capable of storing in a first location called "I Can Talk To Directly" (ICTTD) 32 in memory the identifiers for each device in the OE from which that Tasking Station receives a responding signal. Likewise as shown in FIG. 5, each Server RDa and RDb is capable of storing in a second location called "They Can Talk To" (TCTT) 34 all other identifiers appearing as part of a responding signal.

For purposes of this discussion, the identifier for Tasking Station TS1 is 1; for TS2 is 2; for TS3 is 3; and for TS4 is 4; the identifier for Controller Hi is I and for Hii is II; and the identifier for Server RDa is A and for RDb is B.

As described, each processor 20 in each device TS1–TS4, Hi and Hii and RDa and RDb, respectively, is programmed or otherwise constructed to provide a variety of functional capabilities.

First, the processor 20 is capable of selecting information from memory 25 such as the identifiers of each device in the OE 10 and is capable of establishing device identity, that is, the processor 20 can discretely recognize the identifier for the device in which the processor resides from any other identifier stored in memory 25.

Second, processor 20 is capable of signal construction, transmission, analysis and manipulation. That is, processor 20 is capable of:

a. transmitting a signal along each line V or Z connected to the device in which the processor is resident;

b. receiving a signal from each line V or Z connected to the device;

c. transmitting a responding signal along each line V or Z connected to the device, either by reflecting back a received signal, or by duplicating a received signal or by constructing a signal so that it contains one or more identifiers (either of the former two signals referred to as an "echo" signal) either in a determined order or in a random order;

d. discretely recognizing a received signal;

e. comparing two signals to determine if they are the same or different;

f. discretely identifying each identifier in each signal received;

g. determining whether a signal is a polling signal or a responding signal;

h. for a received signal, determining and separately dealing with the identifier for a device from which a polling signal is received; the identifier for a device from which a responding signal is received; and identifier of any other device appearing as part of the received signal; and i. ceasing to transmit one signal and sending instead another signal.

For the purposes of this discussion, a reflected signal or a responding signal which duplicates a received signal will be referred to as an "echo" signal.

Simplistic OE In Service Determination

Referring to FIG. 1, assume that the failure of a Controller Hi or Hii possibly might not mean that the OE should be declared Out of Service. However, assume that a failure of either a Tasking Station TS1–TS4 or a Server RDa or RDb in addition to a Controller failure requires that the OE be declared Out of Service.

The instant invention easily resolves this, permitting each Tasking Station and Server to determine its own service status from which service status for the OE 10 is by corollary determined. Referring to FIG. 1, each processor 20 resident in each Tasking Station TS1–TS4 and each processor 20 resident in each Server RDa and RDb initiates a polling signal along each communication channel, lines V and/or lines Z, which are connected to the Tasking Station TS1–TS4 or Server RDa and RDb, respectively. The processors 20 for the Tasking Stations TS1–TS4 and Servers RDa and RDb are programmed or otherwise constructed to provide a responding signal which includes the identifier for the device on which the processor 20 is resident to any polling signal received. Controllers Hi and Hii are programmed to provide an echo signal to any polling signal received along every line V or Z connected to the Controller Hi or Hii, without regard to the line from which the polling signal was originally received.

Rule 1) if a node is able to talk to all hubs in the OE, then the node is "In Service"

Figure 2:
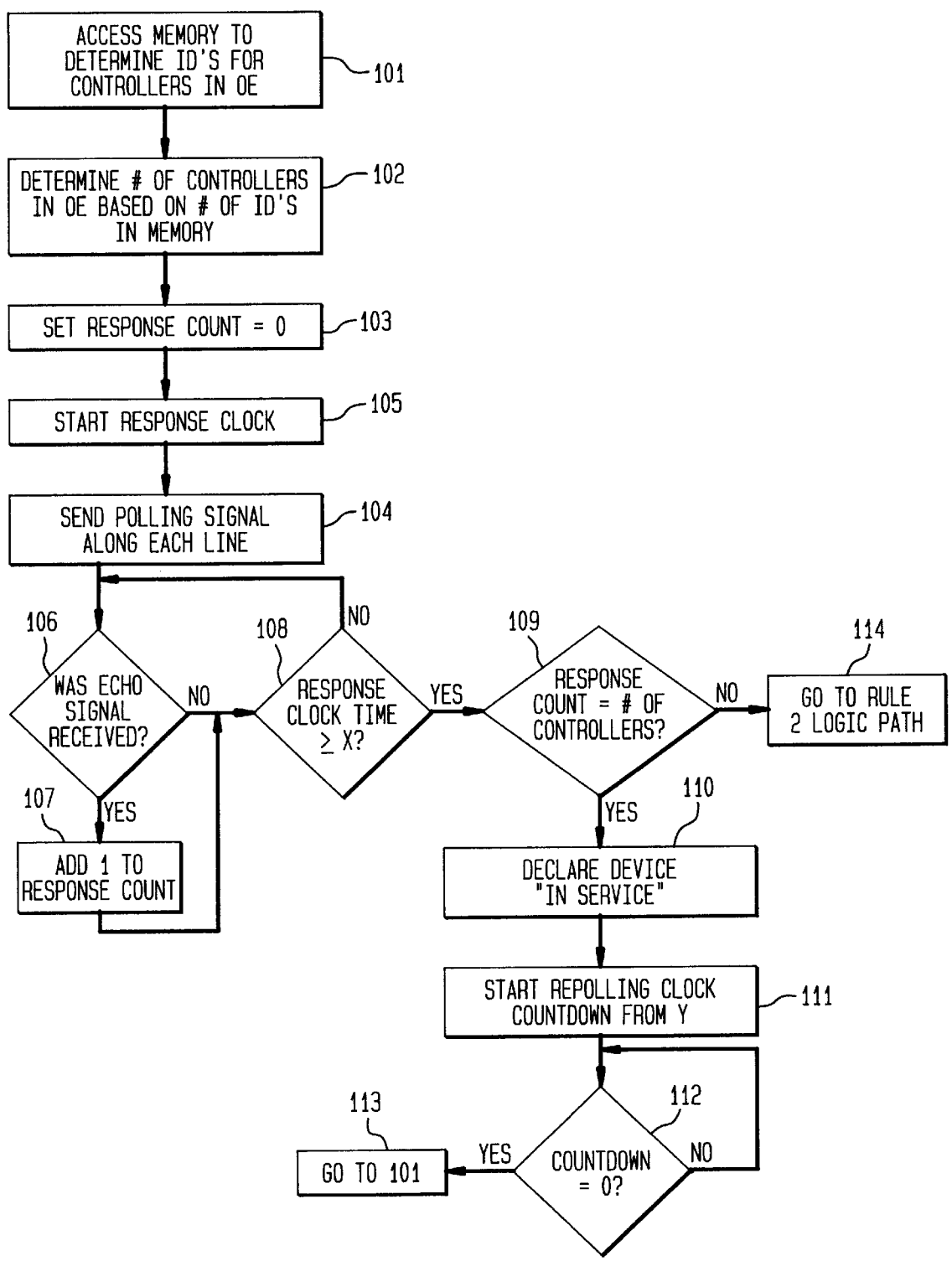
FIG. 2 is a flow chart representing the logic flow of a device applying Rule 1.

Rule 1 is implemented in the first implementation of the invention as follows with reference to FIG. 2 for any Tasking Station TS1–TS4 and for any Server RDa and RDb in the OE 10. For the purpose of this illustration, the device followed will be Tasking Station TS1.

Tasking Station TS1 processor 20 accesses permanent memory 25 and retrieves the identification of each Controller Hi and Hii in the OE 10 (101). From this, the processor 20 determines the number of Controllers in the OE (102). The processor 20 then sets the Response Counter 26 count (the Response Count) to zero (103) and sends a polling signal along each line V connected to Tasking Station TS1 (104). At the time the polling signal is sent, the processor 20 starts Response Clock 22 to run for some time X (105). For each signal received, processor 20 determines whether the signal is an echo signal of that sent by processor 20 for Tasking Station TS1 because any other signal does not necessarily indicate that a Controller Hi or Hii is functional. If processor 20 determines that a received signal is an echo signal (106), the processor 20 adds one to the Response Count (107) until the Response Clock 22 times out at X (108). The processor 20 then compares (109) the Response Count with the number of Controllers Hi and Hii in the OE 10. If the Response Count in Response Counter 26 equals the number of Controllers the processor 20 has determined are in the OE 10, Tasking Station TS1 is declared "In Service" (110) and the processor 20 starts the RePolling Clock 24 at Y from which it counts down to 0 (111). When the processor 20 determines that the RePolling Clock 24 has timed out (112), processor 20 reinitiates the polling sequence (113).

However, if the processor 20 determines that the Response Count is less than the number of Controllers the processor 20 has determined are in the OE 10, the results do not satisfy the "In Service" status requirements under Rule 1 and therefore processor 20 must implement Rule 2 (114) to determine the service status of TS1.

Rule 2) if the node fails Rule 1, but the node can talk to all other nodes, then the node is "In Service"

Rule 2 is implemented in the first implementation as follows with reference to FIG. 3, again using Tasking Station TS1 as illustrative of each Tasking Station TS1–TS4 and each Server RDa and RDb in the OE 10.

Tasking Station TS1 processor 20 accesses memory 25 to secure the identifiers for each Tasking Station TS2–TS4 and each Server RDa and RDb in the OE (201). From this, the processor 20 determines the number of Tasking Stations and Servers in the OE 10 (202).

The Tasking Station TS1 processor 20 then sets the Response Counter count to 0 (203) and sends a polling signal along each line V connected to Tasking Station TS1 (204). At the time the polling signal is sent, the processor starts Response Clock 22 to run for some time X (205). For each responding signal received (206), the processor 20 analyzes (206a) the responding signal to determine whether it is other than an echo signal. The reason for this is that in this first implementation Controllers Hi and Hii provide only echo signals for each signal received and transmit the echo signal along each line V and Z connected to the Controller. This functionality permits the Controller to hand-off a signal as well as return it to the initiating device. When a Controller receives a polling signal, the Controller will not only return the polling signal as an echo signal to the initiating device, but the Controller will also send that signal along any other line connected to the device. Consequently, any Tasking Station TS1–TS4 and any Server RDa–RDb acting as an initiating device which sends a polling signal, through the signal hand-off provided by the Controllers Hi-Hii, is able to receive a responding signal from any device with which the initiating device is in communication, even when that communication channel in through an operating Controller. Because the processors 20 can discern one signal from another, a responding signal can be determined by processor 20 in any initiating device TS1–TS4 and RDa–RDb to be an echo signal, a responding signal other than an echo signal, or a signal which is not a responding signal.

For every signal received which is not an echo signal (206a) and which is a proper responding signal (206b), the processor 20 adds one (207) to the count in the Response Counter 26 (the Response Count) until the Response Clock 22 times out at X (208). Once the Response Clock has timed out, if the processor 20 determines (209) that the Response Count equals the number of Tasking Stations TS1–TS4 and Servers RDa–RDb in the OE 10, Tasking Station TS1 is declared "In Service" (210) and the processor 20 starts the RePolling Clock to count down from some time Y (211). When the processor 20 determines (212) that the RePolling Clock 24 has timed out, Tasking Station TS1 processor 20 reinitiates the polling sequence (213).

If the processor 20 determines (209) the Response Count is less than the aggregate number of Tasking Stations and Servers in the OE 10, not counting Tasking Station TS1, the processor 20 will declare the Tasking Station TS1 "Out of Service" because the Tasking Station TS1 does not satisfy the In Service status requirements under Rule 1 or Rule 2.

Figure 3:
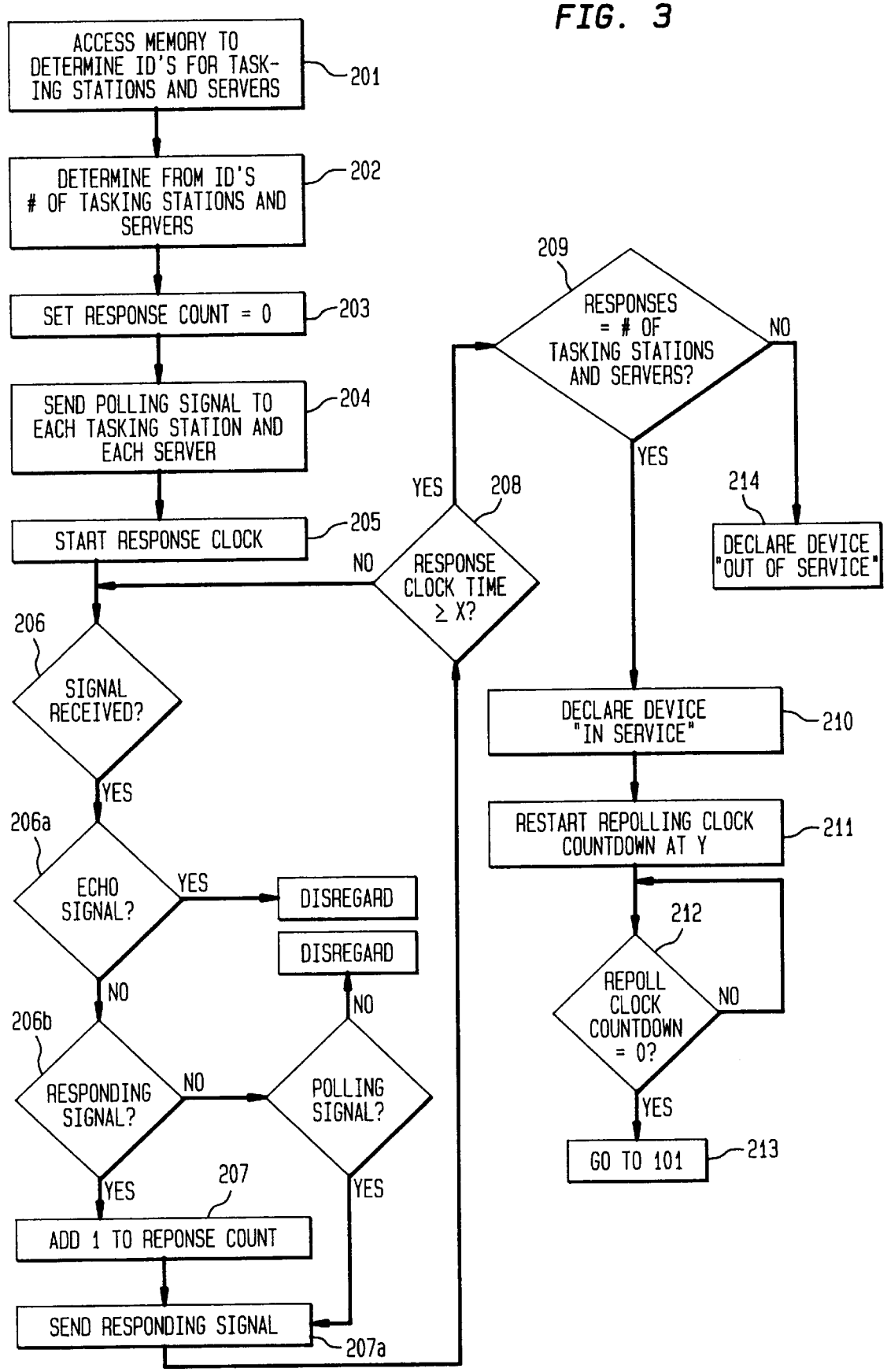
FIG. 3 is a flow chart representing the logic flow of a device applying Rule 2.

At this juncture, it is valuable to recognize that, while the foregoing discussion of Rules 1 and 2 do so from the perspective of a single device, Tasking Station TS1, each and every device in the OE 10 other than a hub (Controllers Hi and Hii) is conducting the same polling activity to independently determine its own In Service/Out of Service status. In certain circumstances this simultaneous polling could result in a signal being received by a device which is not a responding signal but is actually a polling signal from another device. As stated above, each processor 20 is capable of discerning one signal from another, is capable of discerning elements within a signal and is likewise capable of constructing signals to contain certain elements. Consequently, each processor 20 can distinguish between a responding signal and an initiating signal by, for example, including in each transmitted initiating signal the identifier for the initiating device and breaking down each received signal to determine each identifier included as part of that received signal. Conversely, each processor 20, for each received signal, can construct and transmit a responding signal which includes both the identifier(s) in each received signal as well as the identifier for the device in which the processor is resident. While this is not necessary when only a single device is polling, this capability is important where a number of devices are polling simultaneously. This capability is shown in FIG. 3 in which decision steps 206a & 206b comprise step 206 and step 207a is included in the process.

It is further useful to recognize at this juncture that polling for Rule 1 and Rule 2 need not be conducted separately but can be part of the same polling process. As can be seen by a comparison of FIGS. 1 and 2, all that is necessary is for processor 20 to discern between echo signals received and other signals received and keep a separate response count of echo signals from the response count for other responding signals. If the echo signal Response Count is not equal to the number of Controllers, processor 20 can immediately determine if the Response Count for other responding signals equals the aggregate number of Tasking Stations and Servers in the OE. No separate polling needs to be conducted to investigate under each rule.

Greater Resilience In-Service Determination

As stated above, application of Rules 1 and 2 will provide an indication of In-Service status only when no device, other than a hub (a Controller as described above), is out of service. Also as observed above, there may be certain instances when it would be useful to permit the OE to have more resilience, that is, to continue to be considered In Service even though more devices comprising a part of the OE individually declare themselves Out of Service. This is accomplishable by application of Rule 3 by the second implementation of the instant invention.

Rule 3) If the node can talk to all hubs and nodes that any other node says it can talk to, and the sum of the values of all these nodes is more than a predetermined "threshold" value, then the node is In Service.

Figure 4A:
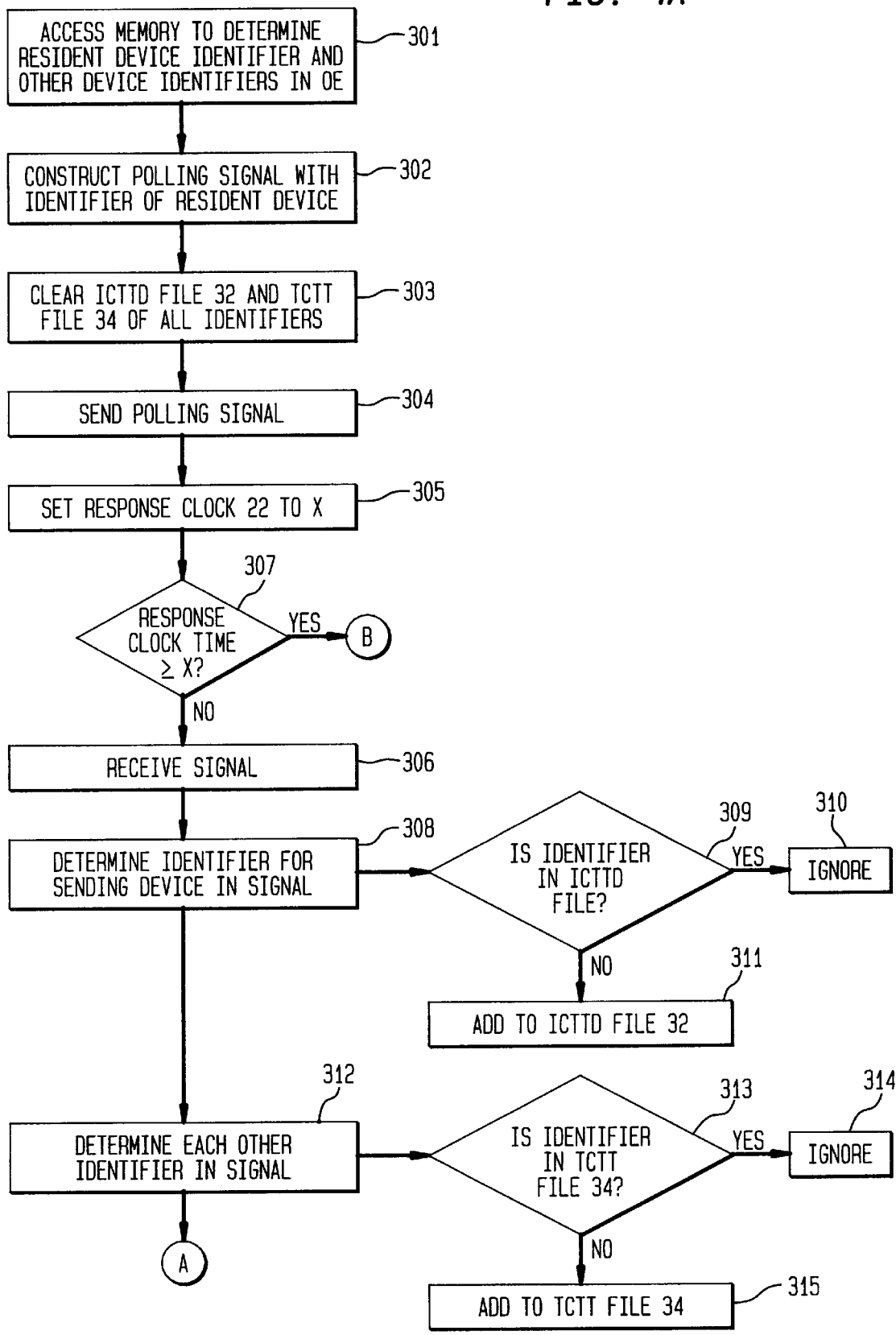
FIGS. 4a,b&c is a flow chart representing the logic flow of a device applying Rule 3.
Figure 4B:
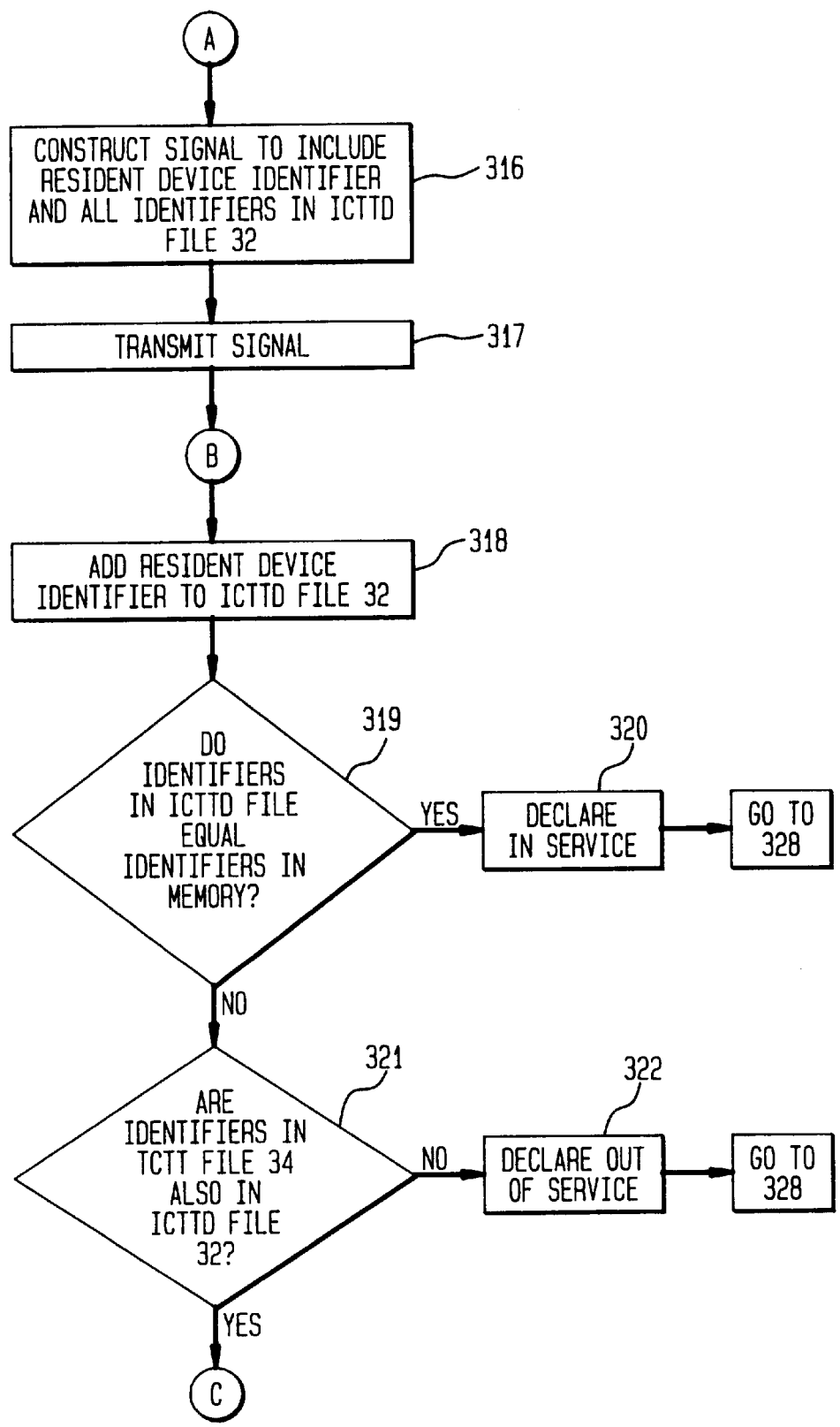
Figure 4C:
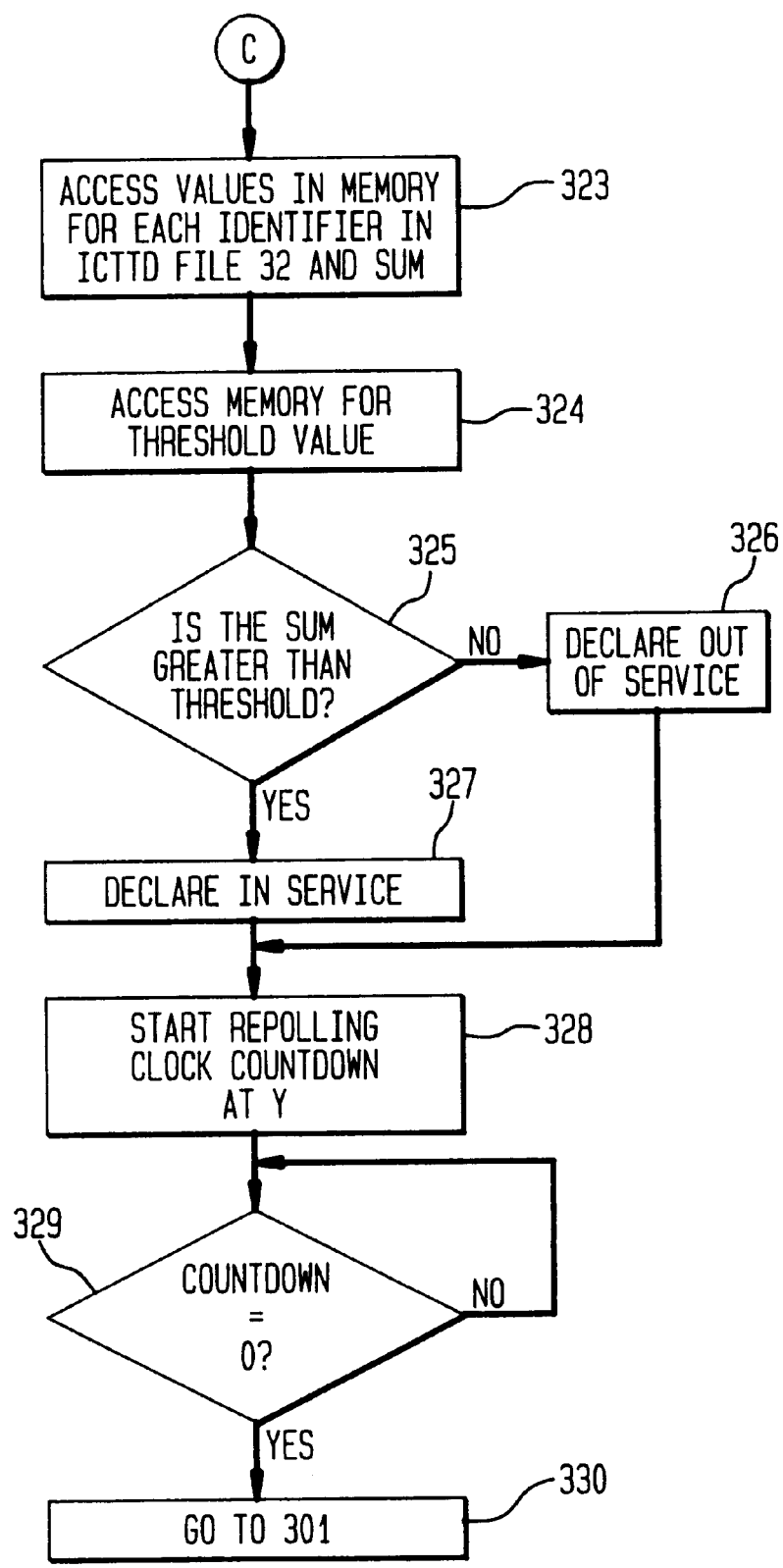

Moreover, application of Rule 3 is accomplished within the polling regime and with the equipment and functionality used to determine In Service status under Rules 1 & 2. Referring to FIG. 4, the second implementation of the instant invention is illustrated. Again, as with Rules 1 and 2, the same hypothetical OE comprised of four Tasking Stations TS1–TS4, two hub Controllers Hi-Hii, and two Servers RDa–RDb is used to illustrate application of the invention within an OE environment. Again, a single device, Tasking Station TS1, will be used to illustrate the process of the instant invention in this second implementation.

Threshold Value

In implementing the instant invention to provide an In Service status determination when more devices that a hub has failed in the OE 10, each device comprising part of the OE is assigned a numeric value determined by the importance of that device to the acceptable functioning of the OE 10. For example, as shown is FIG. 1, Tasking Stations TS1–TS4 are each assigned the value 2; each Controller Hi & Hii is assigned the value 0; and each Server RDa & RDb is assigned the value 4. The aggregate value of all devices in the OE 10 totals 16. In order for the devices in the OE not to divide into two independently operating units, the threshold value for the OE to be declared In Service must exceed half the aggregate value. So, in the instant illustration, the threshold value of those OE devices declared to be In Service must exceed 8 in the aggregate. Recognize, however, that the threshold value could be set at any value higher, for example, 9,10,11,12,13,14 or 15 depending upon the desires and considerations in setting the threshold at which the OE is to be considered In Service. While the selection of the values assigned may appear arbitrary, they are not. Under the weighted values assigned to each type of device, the OE will be declared In Service in the hypothetical configuration illustrated in FIG. 1, only if one Server, at least one hub Controller and at least three Tasking Stations are working or, alternatively, two Servers, at least one hub Controller, and at least one Tasking Station are working. Notice that if both hub Controllers are not working that no signals can be received from any device by any other device. Consequently, in this hypothetical, there is no need to assign any value to the Controllers, without them the system is Out Of Service. Even if every other device is operating, there is no way to communicate other than through a Controller along lines V and Z and consequently no device will collect an aggregate value of responding devices, other than perhaps the value of the polling device, and this is less than the threshold value in the hypothetical.

Talking to Every Device Any Other Node Can Talk To

Further, as illustrated in FIG. 5, processor 20 has as part of memory 25 two file locations, ICTTD 32 in which processor 20 stores the identifier of each device from which it receives a responding signal and TCTT 34 in which processor 20 stores every other identifier processor 20 finds in any signal received.

The value assigned to each device in the OE is stored in each processor 20 in each device, TS1–TS4, Hi&Hii and RDa&RDb, respectively, comprising all devices of interest in the OE 10.

Status polling commences for Tasking Station TS1 with the processor 20 accessing memory 25 (301) to determine the identifiers for each device—node or hub—in the OE 10 and the identifier for the device on which the processor 20 is resident, in the instant illustration, Tasking Station TS1. The processor 20 then constructs (302) a polling signal which includes the identifier for the resident device. Consistent with the previous discussion, Tasking Station TS1 uses "1" as its identifier. In preparation for receiving responding signals, processor 20 clears (303) the I Can Talk To Devices (ICTTD) file 32 and the They Can Talk To (TCTT) file 34 and places the identifier for the resident device in the ICTTD file 32. Processor 20 next sends (304) the constructed polling signal and sets (305) Response Clock 22 to run for some time X.

So long as Response Clock 22 has not expired (307), for each signal received (306) by Tasking Station TS1, its processor 20 determines (308) the identifier for the sending device embedded in the received signal and compares (309) the identifier for the sending device with the identifiers then in the ICTTD file 32. If the identifier is present in the ICTTD file 32, the identifier is ignored (310). If the identifier is not present in the ICTTD file 32, processor 20 adds (311) the identifier to those in the ICTTD file 34. Processor 20 also determines (312) each other identifier embedded in the received signal and compares (313) each other identifier with the identifiers then in the TCTT file 34. If the identifier is present in the TCTT file 34, the identifier is ignored (314). If the identifier is not present in the TCTT file 34, processor 20 adds (315) the identifier to those in the TCTT file 34.

The processor 20 for Tasking Station TS1 then constructs (316) a signal which includes (i) the identifier for Tasking Station TS1 and (ii) every identifier then in the ICTTD file 34. That new signal is then transmitted (317) along every line V connected to Tasking Station TS1.

When the response clock 22 times out, processor 20 places (318) the identifier for the device on which it is resident, in this case Tasking Station TS1, in the ICTTD file 32. Processor 20 then retrieves from memory 25 the identifiers for all devices comprising the OE 10, including the resident device identifier and compares (319) the retrieved identifiers against the identifiers in ICTTD file 32. If there is a complete match, processor 20 declares (320) Tasking Station TS1 In Service. If there is not a complete match, processor 20 proceeds to apply Rule 3.

Processor 20 compares (321) the identifiers in the TCTT file 34 against the identifiers in the ICTTD file 32. If there is a mismatch, that is, there is an identifier in the TCTT file 34 which is not in the ICTTD file 32, processor 20 declares Tasking Unit TS1 Out of Service because Tasking Unit TS1 is unable to satisfy the first part of Rule 3 because it is not able to talk with all devices which another device is able to talk to.

If all identifiers in TCTT file 34 also appear in ICTTD file 32, processor 20 then must determine if the devices with which Tasking Station TS1 can talk are of sufficient importance to OE operation that their aggregate value will exceed the threshold value of 8. Processor 20 accesses (323) the correlated device value resident in memory 25 for each identifier in ICTTD file 32 and sums those values. Processor 20 then accesses (324) memory 25 for the OE threshold value and compares (325) the sum against the threshold value. If the sum does not exceed the threshold value, processor 20 declares (326) Tasking Station TS1 Out of Service.

If the sum exceeds the threshold value, processor 20 declares (327) Tasking Station TS1 In Service.

After declaring the status of Tasking Station TS1, processor 20 starts (328) a RePolling Clock to countdown from some time Y, and upon the expiration of time Y (329), polling by Tasking Station TS1 is recommenced (330).

For the OE configuration and having the weighted values as shown in FIG. 1, the threshold value to declare the OE In Service must be greater than 8. If it is assumed that Tasking Station TS2 and Server RDa are not functioning, at the end of the polling interval, ICTTD file 32 for Tasking Station TS1 will contain all other device identifiers and the aggregate value of the responding devices will be 10 (TS1=2, TS3=2, TS4=2, Hi=0, Hii=0, RDb=4) which is greater than the threshold value 8. Therefore, Tasking Station TS1 will declare itself "In Service". Likewise, since every other operational device in the OE 10 will arrive at the same aggregate value, every other operational device in the OE will declare itself In Service and thus the OE itself remains In Service.

Continuing with the configuration in FIG. 1, assume next that Controller Hi, in addition to Tasking Station TS2 and Server RDa, does not respond to the polling signal of Tasking Station TS1. With their assigned values, the aggregate value of the responding devices determined by Tasking Station TS1 would be 10 (TS1=2, TS3=2, TS4=2, Hii=0, RDb=4) and Tasking Station TS1 would declare itself In Service. Likewise, since every other operational device in the OE 10 will arrive at the same aggregate value, every other operational device in the OE 10 will declare itself In Service as well and thus the status of the OE 10 itself remains In Service.

Still continuing with the configuration of FIG. 1, assume next that Tasking Station TS3, in addition to Controller Hi, Tasking Station TS2 and Server RDa, does not respond to the polling signal of Tasking Station TS1. With their assigned values, the aggregate value of the responding devices determined by Tasking Station TS1 would be 8 (TS1=2, TS4=2, Hii=0, RDb=4) and Tasking Station TS1 would declare itself Out of Service. Similarly, since every other responding device in the OE 10 will arrive at the same aggregate value, every other operational device in the OE 10 will also declare itself Out of Service and thus the status of the OE itself will become Out of Service.

Finally, continuing with the configuration of FIG. 1, assume that both Controller Hi and Controller Hii are out of service. Since every line V and Z connects through one or the other Controller, no Tasking Station or Server can talk with any other Tasking Station or Server. Consequently, even though each Tasking Station or Server in the OE 10 is operational, since none of them can receive any signal from any other device, each Tasking Station and Server will have only its own identifier in the ICTTD file 32. For example, Tasking Station TS1 would have only its identifier in the ICTTD file 32 and consequently the aggregate value of identifiers in the ICTTD file 32 for Tasking Station TS1 will only equal 2 (TS1=2), which is less than the threshold value of 8 which must be exceeded to declare the device In Service and Tasking Station TS1 will consequently declare itself Out of Service. Since every other device in the OE 10 will arrive at a value less than the threshold value, the status of the OE 10 will likewise become Out of Service.

A Hypothetical Business Application

The service provided by an OE 10 to the system 40 is unimportant from the perspective of the instant invention. However, a description of a possible service will assist the reader in appreciating the value of the instant invention. OE 10 can provide a distributed database capability to a plurality of workstations. The workstations comprise the balance of system 40 and are themselves incapable of processing data, each workstation is comprised of a monitor and keyboard by which the user is able to interact with and receive information from the OE 10. Each workstation is a "dumb" workstation and provides computing capability to its user by accessing the capabilities of a Tasking Station TS1–TS4. Tasking Station TS1–TS4 could have, for example, an automotive insurance carrier's suite of application programs which provide a user at a workstation the necessary worksheets and final documents to, for example, determine the eligibility of an applicant to receive insurance on a vehicle, calculate a premium and provide an insurance contract. However, assume that premiums are, among other things, based on prior claims history by the applicant, and company-wide experience with a particular make and model vehicle. Also assume that client histories are kept in one database resident on Server RDa and vehicle claims experience profiles are kept on another database resident on Server RDb. In this hypothetical, premium rates are dynamically calculated based upon, among other things, the number of vehicles insured at any point in time of the particular make and model vehicle as that vehicle owned by the applicant. Assume that the volume of requests for information from Servers RDa and RDb by Tasking Stations TS1–TS4 will cause access to be undesirably delayed unless access is directed by Controllers Hi and Hii which queue and prioritize Tasking Station inquiries and selectively access Servers RDa and RDb.

As long as all devices comprising the OE are operational, the users at the workstations will be serviced. However, if certain devices become non-functional, it becomes necessary to prevent further use of the OE. For example, should a Controller Hi or Hii fail, the OE can be allowed to continue to operate because the individual Controllers only contribute to the speed of the OE and do not affect the integrity or completeness of the information being provided. In contrast, failure of a Tasking Station TS1–TS4 would affect the OE's ability to dynamically determine premiums because not all Tasking Stations could communicate the number of vehicles of a given make and model which are insured by the offices served by the Tasking Station. Likewise, failure of a Server RDa or RDb would affect the OE's ability to calculate premiums since client histories or vehicle claims experience profiles would be lacking.

Nevertheless, it may be acceptable to provide coverage where either client histories or vehicle claims experience are known. As can be seen, the above described method of determining individual device status can determine when the processing system is usable—In Service—for agents and, depending upon the implementation of Rules 1&2 or Rule 3, can provide some further system resilience before an Out of Service determination is made.

While the instant invention has been described in terms of a specific OE configuration, it is recognized and appreciated that the instant invention readily lends itself to other configurations. Likewise, while the instant invention has been described in terms of two specific implementations, within each implementation it is recognized and appreciated that various modifications and improvements can be made within the spirit of the invention. For example, while in the preferred implementation the number of devices in the OE is determined from the number of identifiers in memory, it can as easily be determined by inputting that number to memory and directing the processor to where it can be found. Likewise, while the configuration used in implementing Rules 1 and 2 is described as having each hub providing only an echo signal, it could as easily permit each hub to produce a responding signal of its own and that the responding signal be analyzed under Rule 1 much as it is analyzed under Rule 2.

The invention is thus limited only as defined in the accompanying claims.

What is claimed is:

1. For an Operational Entity (OE) comprised of a plurality of processor-based nodes and hubs, each said node having memory and each said node communicating via communication channels either directly with or through one or more hubs to each other said node in the OE, a process for each said node to self-determine the service status of the OE, comprising, for each said node, the steps of:
   determining whether said node can communicate with each said hub in the OE;
   if said node can communicate with each said hub in the OE, said processor for said node declaring the service status for said node as "In Service";
   if said node cannot communicate with each said hub in the OE, said node determining if said node can communicate with each other said node in the OE;
   if said node cannot communicate with each other said node in the OE, said processor for said node declaring the service status for said node and said OE as "Out of Service",
   whereby the service status of the OE is determined from the perspective of each said node.

2. The process of claim 1 in which the step of said node determining whether said node can communicate with each said hub in the OE is comprised of the steps of:
   said node determining the number of hubs in the OE;
   said node setting a timer to time out after a selectable interval;
   said node sending an identifiable polling signal along each said communication channel connected to said node;

each said hub in the OE responding to each polling signal received with a responding signal sent along each said communication channel connected to said hub, said responding signal having a characteristic form from which each said node can discern that the responding signal is sent by a hub;

said node receiving a responding signal;

said node determining whether the responding signal is from one of said hubs;

said node counting the number of responding signals received from said hubs;

said node determining that the timer has timed out;

said node comparing the number of said hubs in the OE with the number of responding signals counted; and if the number of responding signals counted equals the number of said hubs in the OE, the processor for said node declares the status for said node as "In Service".

3. The process of claim 2 in which the responding signal sent by each said hub is an echo signal of the polling signal.

4. The process of claim 1 in which the step of said node determining whether said node can communicate with each other said node in the OE is comprised of the steps of:

said node determining the total number of said nodes in the OE;

said node setting a timer to time out after a selectable interval;

said node sending an identifiable polling signal along each said communication channel connected to said node;

said node responding to each polling signal received with a responding signal sent along each said communication channel connected to said node, each said responding signal having a characteristic form from which each said node receiving said responding signal can discern that the responding signal is sent by a node;

said node receiving a responding signal;

said node determining whether the responding signal is from one of each other said node;

said node counting the number of responding signals received from each other said node;

said node determining that the timer has timed out;

said node adding one to the count of the number of responding signals received from each other said node to arrive at the total number of responding signals received;

said node comparing the number of nodes in the OE with the number of responding signals counted;

if the number of responding signals counted equals the number of nodes in the OE, the processor for the said node concludes that said node can communicate with each other said node in the OE and declares the status for the node and the OE as "In Service"; and if the number of responding signals counted is other than the number of nodes in the OE, the processor for the said node concludes that said node cannot communicate with each other said node in the OE and declares the status for the said node and the OE as "Out of Service".

5. The process of claim 1 in which the step of said node determining whether said node can communicate with each other said node in the OE is comprised of the steps of:

said node determining the number of nodes, not counting itself, in the OE;

said node setting a timer to time out after a selectable interval;

said node sending an identifiable polling signal along each said communication channel connected to said node;

each said node in the OE responding to each polling signal received with a responding signal sent along each said communication channel connected to said node, said responding signal having a characteristic form from which each said node receiving said responding signal can discern that the responding signal is sent by a node;

said node receiving a responding signal;

said node determining whether the responding signal is from one of each other said node in the OE;

said node counting the number of responding signals received from each other said node;

said node determining that the timer has timed out;

said node comparing the number of nodes in the OE with the number of responding signals counted;

if the number of responding signals counted equals the number of nodes in the OE, the processor for said node concludes that said node can communicate with each othe said node in the OE and declares the status for said node and the OE as "In Service"; and if the number of responding signals counted is other than the number of nodes in the OE, the processor for said node concludes that said node cannot communicate with each other said node in the OE and declares the status for said node and the OE as "Out of Service".

6. For an Operational Entity (OE) comprised of a plurality of processor-based nodes and hubs, each said node communicating via communication channels through one or more hubs with each other said node, each said node having memory and having in memory a unique assigned identifier and an assigned weighted value for said node, and each said node having also in memory the assigned identifier and the assigned weighted value for each other said node in the OE and a threshold value for the OE to be declared "In Service", a process for determining the service status of the OE by each said node self-determining its operational status, comprising, for each said node, the steps of:

determining if said node can communicate with each said hub and each other said node with which each other said node can communicate;

if said node cannot communicate with each said hub and each other said node with which each other said node can communicate, declaring said node "Out of Service";

if said node can communicate with each said hub and each other said node with which each other said node can communicate, determining if said node can communicate with all said hubs and all said nodes comprising the OE;

if said node can communicate with all said hubs and all said nodes comprising the OE, said node declaring itself "In Service";

if said node cannot communicate with all said hubs and all said nodes comprising the OE, determining the sum of the weighted values for each said hub and each other said node with which said node can communicate;

comparing said sum to the threshold value in said memory for said node;

if said sum is greater than the threshold value, said node declaring itself and the OE "In Service"; and if said sum is less than the threshold value, said node declaring itself and the OE "Out of Service", whereby the service status of the OE is determined from the perspective of each said node.

7. The process of claim 6 in which the step of said node determining whether said node can communicate with each said hub and each other said node in the OE is comprised of the steps of:

said node determining the identifiers for each said hub and each other said node in the OE;

said node determining the identifier for said node;

said node constructing a polling signal containing the identifier for said node;

said node setting a timer to time out after a selectable interval;

said node sending an identifiable polling signal along each said communication channel connected to said node which includes the identifier for said node;

each said hub in the OE responding to each signal received with a responding signal sent along each said communication channel connected to the hub, said responding signal having a characteristic form which contains the identifier for the hub and the identifier for each other hub and for each node from which the hub has received a signal;

each said node in the OE responding to each signal received with a responding signal sent along each said communication channel connected to the node, said responding signal having a characteristic form which contains the identifier for the node and the identifier for each said hub and for each other said node from which the node has received a signal;

said node receiving a signal;

said node determining the identifier embedded in the signal for the node or the hub sending the signal and comparing the identifier with identifiers of sending nodes and sending hubs contained in previously received signals and kept in memory at a location A;

if the identifier in the received signal is not in memory at location A, placing it in memory at location A;

if the identifier in the received signal is in memory at location A, ignoring the identifier;

said node determining each other identifier embedded in the received signal and comparing each other identifier with identifiers contained in previously received signals and kept in memory at a location B;

if the each other identifier is not in memory at location B, placing the each other identifier in memory at location B;

said node constructing a responding signal having a characteristic form which includes the identifier for said node and the identifiers in location A;

said node determining that the timer has timed out;

said node determining if identifiers in location A include an identifier for each said hub and each other said node in the OE; and if location A includes an identifier for each said hub and each said node in the OE, said node concluding that said node can communicate with all said hubs and all said nodes comprising the OE.

8. The process of claim 7 in which the step of determining if said node can communicate with each said hub and each other said node with which each other said node can communicate is further comprised of the steps of:

said node comparing the identifiers in location B against the identifiers in location A in memory; and if every identifier in location B is also in location A, said node concluding that said node can communicate with each said hub and each other said node with which each other said node can communicate.

* * * * *